(12) United States Patent
Tanaka

(10) Patent No.: US 10,810,717 B2
(45) Date of Patent: Oct. 20, 2020

(54) IMAGE PROCESSING APPARATUS, IMAGE PROCESSING METHOD, AND IMAGE PROCESSING SYSTEM

(71) Applicant: CANON KABUSHIKI KAISHA, Tokyo (JP)

(72) Inventor: Toru Tanaka, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 15/992,011

(22) Filed: May 29, 2018

(65) Prior Publication Data
US 2019/0066280 A1 Feb. 28, 2019

(30) Foreign Application Priority Data
Aug. 31, 2017 (JP) .................. 2017-167253

(51) Int. Cl.
*G06T 5/50* (2006.01)
*G06T 7/62* (2017.01)
*G06T 3/40* (2006.01)
*G06T 7/30* (2017.01)
*G06T 5/00* (2006.01)

(52) U.S. Cl.
CPC .............. *G06T 5/50* (2013.01); *G06T 3/40* (2013.01); *G06T 7/30* (2017.01); *G06T 7/62* (2017.01); *G06T 5/002* (2013.01); *G06T 2207/10072* (2013.01); *G06T 2207/20021* (2013.01); *G06T 2207/20224* (2013.01); *G06T 2207/30004* (2013.01)

(58) Field of Classification Search
CPC .................................. G06T 5/50; G06T 1/20
See application file for complete search history.

(56) References Cited

U.S. PATENT DOCUMENTS

| | | | | |
|---|---|---|---|---|
| 2010/0202711 A1* | 8/2010 | Kondo | ...................... | G06T 1/20 382/254 |
| 2013/0279784 A1* | 10/2013 | Gill | ........................... | G06T 7/74 382/131 |
| 2017/0294033 A1* | 10/2017 | Ganguly | ............... | G06T 7/0012 |

FOREIGN PATENT DOCUMENTS

| | | | | |
|---|---|---|---|---|
| JP | 2009-147830 A | | 7/2009 | |
| WO | WO-2017051876 A1 * | | 3/2017 | ............. H04N 5/369 |

OTHER PUBLICATIONS

Japanese Journal of Radiological Technology, vol. 69, No. 8, 31 , Aiko et al., "Development of temporal subtraction image method in which pixel matching metho in chest simple X-ray is used", pp. 855-863 (Year: 2013).*

* cited by examiner

*Primary Examiner* — Myron Wyche
(74) *Attorney, Agent, or Firm* — Canon U.S.A., Inc. IP Division

(57) ABSTRACT

A first image and a second image having a smaller pixel size than the first image are acquired. Based on a pixel size of the first image, a size of a calculation area to be set on the second image is calculated. A plurality of calculation areas including a corresponding position on the second image corresponding to a position of interest on the first image, and having the calculated area size are set on the second image. In each of the plurality of calculation areas, a representative value based on density values of pixels included in the calculation area is calculated, and based on a density value of a pixel at the position of interest and a plurality of representative values, a difference value between the first and second images at the position of interest is determined.

26 Claims, 8 Drawing Sheets

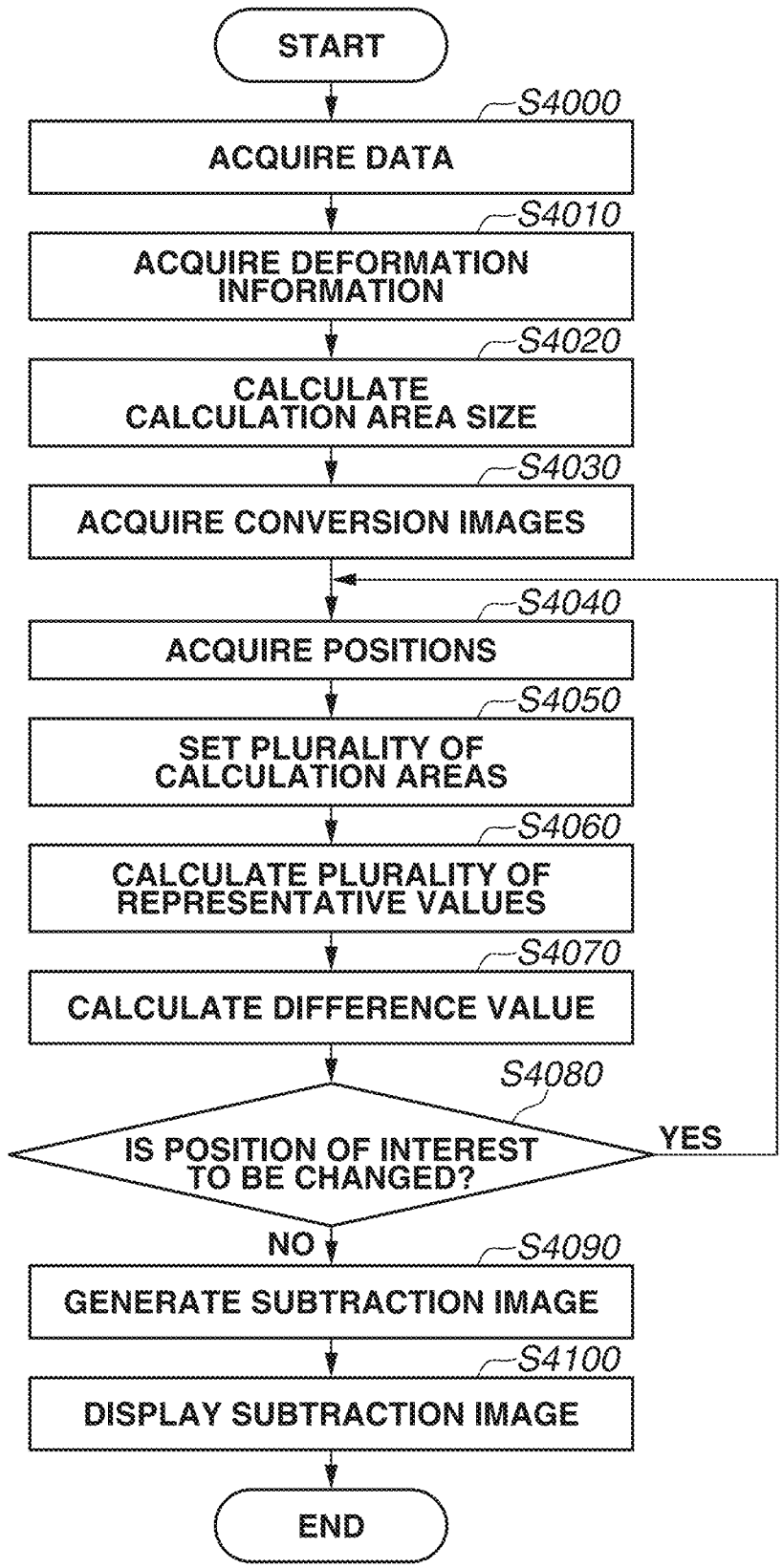

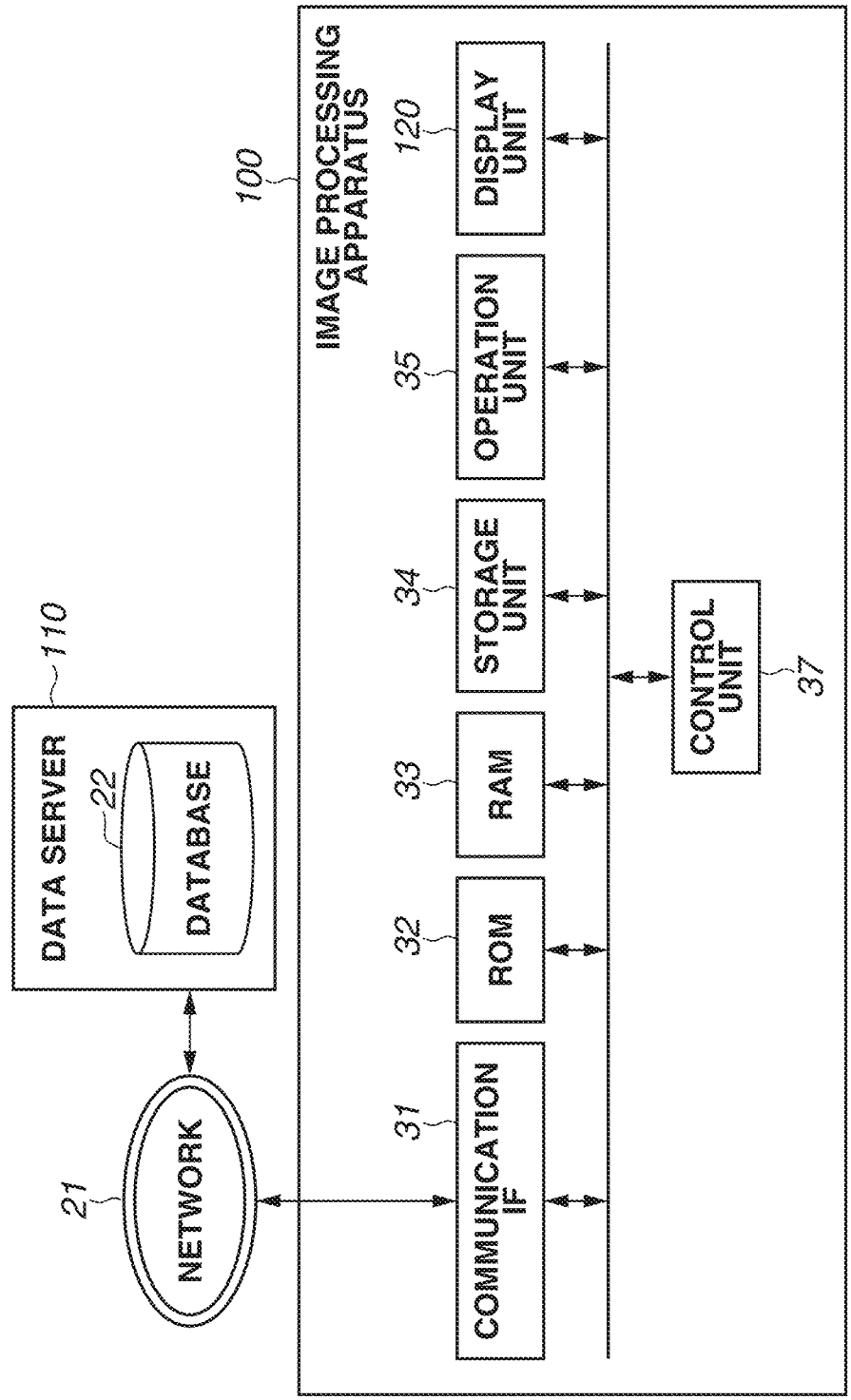

IMAGE PROCESSING APPARATUS, IMAGE PROCESSING METHOD, AND IMAGE PROCESSING SYSTEM

BACKGROUND

Field of the Disclosure

The present disclosure relates to an image processing apparatus, an image processing method, and an image processing system.

Description of the Related Art

In the medical field, a doctor makes a diagnosis using medical images captured with various modalities. Particularly, to perform a follow-up of the state of a subject, the doctor contrasts a plurality of images captured with the same modality at different times and observes temporal changes in the subject. Also, in a field other than the medical field, to observe temporal changes in a physical body, a similar operation may be performed. Further, a diagnosis may be made by, in addition to temporal comparison, contrasting two images obtained by capturing the same subject in different contrast conditions or with different imaging parameters.

A temporal subtraction technique for performing registration between two images and displaying a subtraction image obtained by visualizing the difference between the two images to aid the contrast between the images has been known. However, the difference between the pixel sizes of the two images may make the influence of a partial volume effect great. Then, even in parts corresponding between the images, a difference may occur between the density values of the images. Then, the difference between the density values of the images causes an artifact on a subtraction image. Japanese Patent Application Laid-Open No. 2009-147830 discusses a technique for generating a subtraction image between a low resolution image and an image obtained by converting the pixel size of a high resolution image such that the converted pixel size is the same as the pixel size of the low resolution image. According to this, the density value of a pixel in the high resolution image at a position corresponding to a pixel in the low resolution image can be approximated to the density value of the low resolution image. Thus, it is possible to reduce an artifact on the subtraction image.

Japanese Patent Application Laid-Open No. 2009-147830, however, even if the pixel sizes of the images are matched to each other, but if the positions of discretization of signal data of a subject when generating the images are different between the images, a difference occurs in the density values of pixels in the images. This causes an artifact on a subtraction image.

SUMMARY

Some embodiments are directed to providing an image processing apparatus, an image processing method, and an image processing system that are capable of, between images having different pixel sizes, reducing an artifact on a subtraction image occurring due to the difference between the positions of discretization of signal data.

Some embodiments are also directed to obtaining an operation and an effect that result from the configurations illustrated in the description of the embodiments below and cannot be obtained by a conventional technique.

In some embodiments, an image processing apparatus includes an image acquisition unit configured to acquire a first image and a second image having a smaller pixel size than the first image, an area size calculation unit configured to, based on a pixel size of the first image, calculate a size of a calculation area to be set on the second image, a calculation area setting unit configured to set on the second image a plurality of calculation areas including a corresponding position on the second image corresponding to a position of interest on the first image, the plurality of calculation areas having the calculated area size, a representative value calculation unit configured to, in each of the plurality of set calculation areas, calculate a representative value based on density values of pixels included in the calculation area, and a difference unit configured to, based on a density value of a pixel at the position of interest and a plurality of calculated representative values, determine a difference value between the first and second images at the position of interest.

In some embodiments, an image processing apparatus includes an image acquisition unit configured to acquire a first image and a second image having a larger pixel size than the first image, an area size calculation unit configured to, based on the pixel size of the second image, calculate a size of a calculation area to be set on the first image, a calculation area setting unit configured to set on the first image a plurality of calculation areas including a position of interest on the first image and having the calculated area size, a representative value calculation unit configured to, in each of the plurality of set calculation areas, calculate a representative value based on density values of pixels included in the calculation area, and a difference unit configured to, based on a density value of a pixel at a corresponding position on the second image corresponding to the position of interest and a plurality of calculated representative values, determine a difference value between the first and second images at the position of interest.

Further features of the various embodiments will become apparent from the following description of exemplary embodiments with reference to the attached drawings.

BRIEF DESCRIPTION OF THE DRAWINGS

FIG. 4 is a flowchart illustrating an entire processing procedure according to a second exemplary embodiment.

FIG. 8 is a diagram illustrating a hardware configuration of the image processing apparatus according to the first to third exemplary embodiments.

DESCRIPTION OF THE EMBODIMENTS

Figure 1:
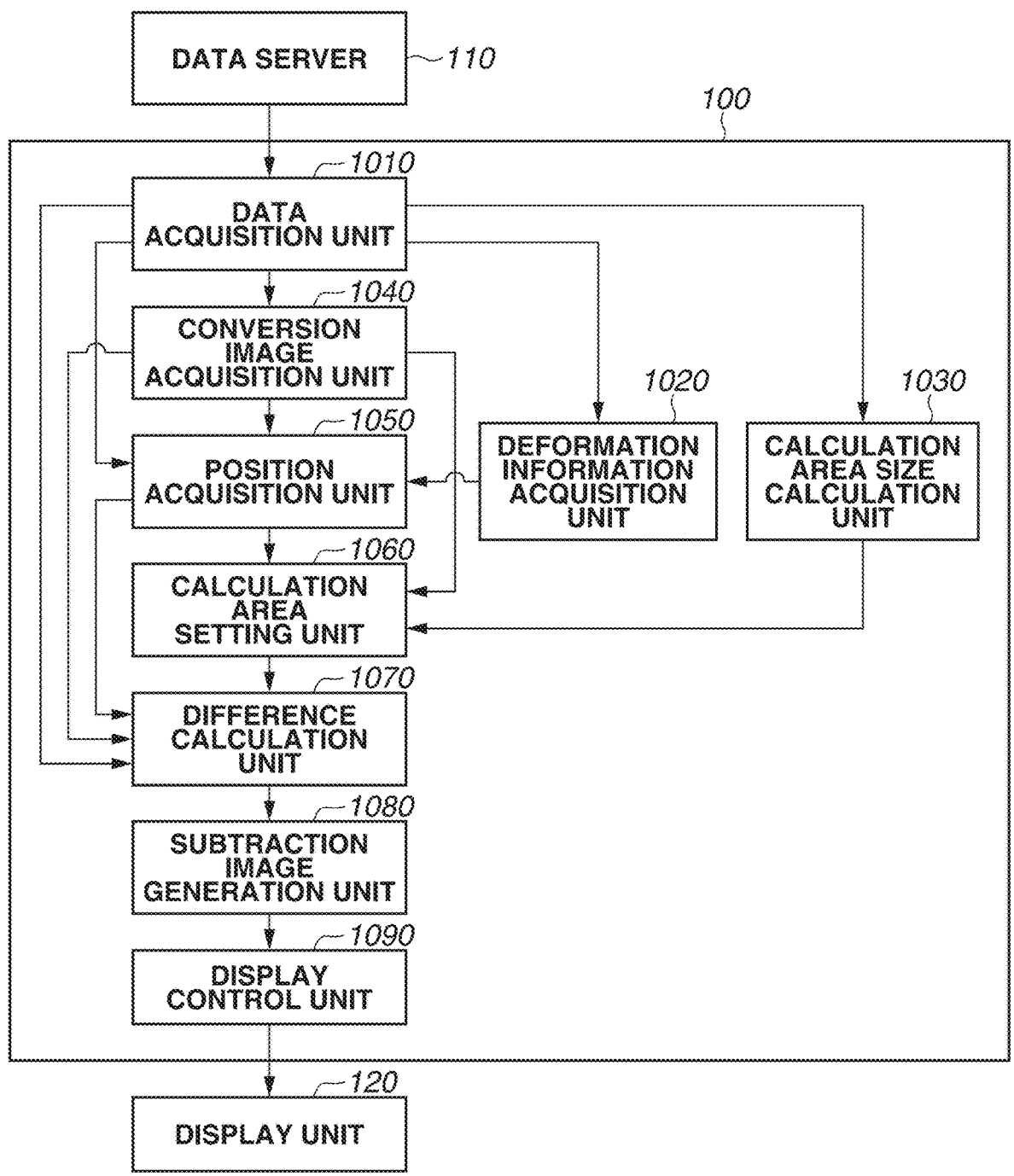
FIG. 1 is a diagram illustrating a device configuration of an image processing apparatus according to a first exemplary embodiment.

Exemplary embodiments of an image processing apparatus will be described in detail below with reference to the attached drawings. The scope of the claims, however, is not limited to illustrated examples.

An image processing apparatus according to a first exemplary embodiment generates a three-dimensional subtraction image between two three-dimensional images (first and second images). The image processing apparatus according to the present exemplary embodiment is characterized by, even in a case where the pixel sizes of the first and second images are different from each other, generating a subtraction image in which the occurrence of an artifact due to the difference between the pixel sizes is reduced. In the following descriptions, an image having a smaller pixel size will be referred to as a "small pixel image", and an image having a larger pixel size will be referred to as a "large pixel image". Further, although the descriptions are given on the premise that the first and second images are three-dimensional medical images, some embodiments are not limited to this.

Normally, when a modality reconfigures an image by converting continuous signal data obtained from a subject, such as a computed tomography (CT) image, into the density values of discretized pixels, the value of the weighted average of signal data of a predetermined section, e.g., the pixel size or the slice thickness in the surface of a slice image, is used. That is, the density value of a pixel having a large pixel size is calculated by smoothing signal data in a wider range than a pixel having a small pixel size. The image processing apparatus according to the present exemplary embodiment approximately regards the density value of the small pixel image as signal data. Consideration is given to a position of interest on the first image, and the calculation of a difference value at the position of interest when a corresponding position on the second image corresponding to the position of interest is given.

First, in a case where the pixel size of the first image is larger than that of the second image, the image processing apparatus sets on the second image (the small pixel image) a plurality of calculation areas having the same size as that of a single pixel in the first image (the large pixel image) by including a corresponding position on the second image (the small pixel image). Next, the image processing apparatus smooths the density value in each of the plurality of calculation areas set on the second image (the small pixel image) to acquire a representative value, thereby approximately obtaining a density value generated from signal data of an area having the same size as that of a single pixel in the first image (the large pixel image). Then, the image processing apparatus compares the density value at the position of interest on the first image (the large pixel image) with the plurality of representative values on the second image (the small pixel image) and selects the representative value closest to the density value at the position of interest from among the plurality of representative values. Finally, the image processing apparatus calculates a difference value between the density value at the position of interest and the selected representative value and generates a three-dimensional subtraction image of which the density value is the calculated difference value at each pixel position (each position of interest) in the image.

On the other hand, in a case where the pixel size of the first image is smaller than that of the second image, the image processing apparatus sets on the first image (the small pixel image) a plurality of calculation areas having the same size as that of a single pixel in the second image (the large pixel image) by including a position of interest on the first image (the small pixel image). Next, the image processing apparatus smooths the density value in each of the plurality of calculation areas set on the first image (the small pixel image) to acquire a representative value, thereby approximately obtaining a density value generated from signal data of an area having the same size as that of a single pixel in the second image (the large pixel image). Then, the image processing apparatus compares the density value at a corresponding position on the second image (the large pixel image) with the plurality of representative values on the first image (the small pixel image) and selects the representative value closest to the density value at the corresponding position from among the plurality of representative values. Finally, the image processing apparatus calculates a difference value between the density value at the corresponding position and the selected representative value and generates a three-dimensional subtraction image of which the density value is the calculated difference value at each pixel position (each position of interest) in the image.

Figure 2:
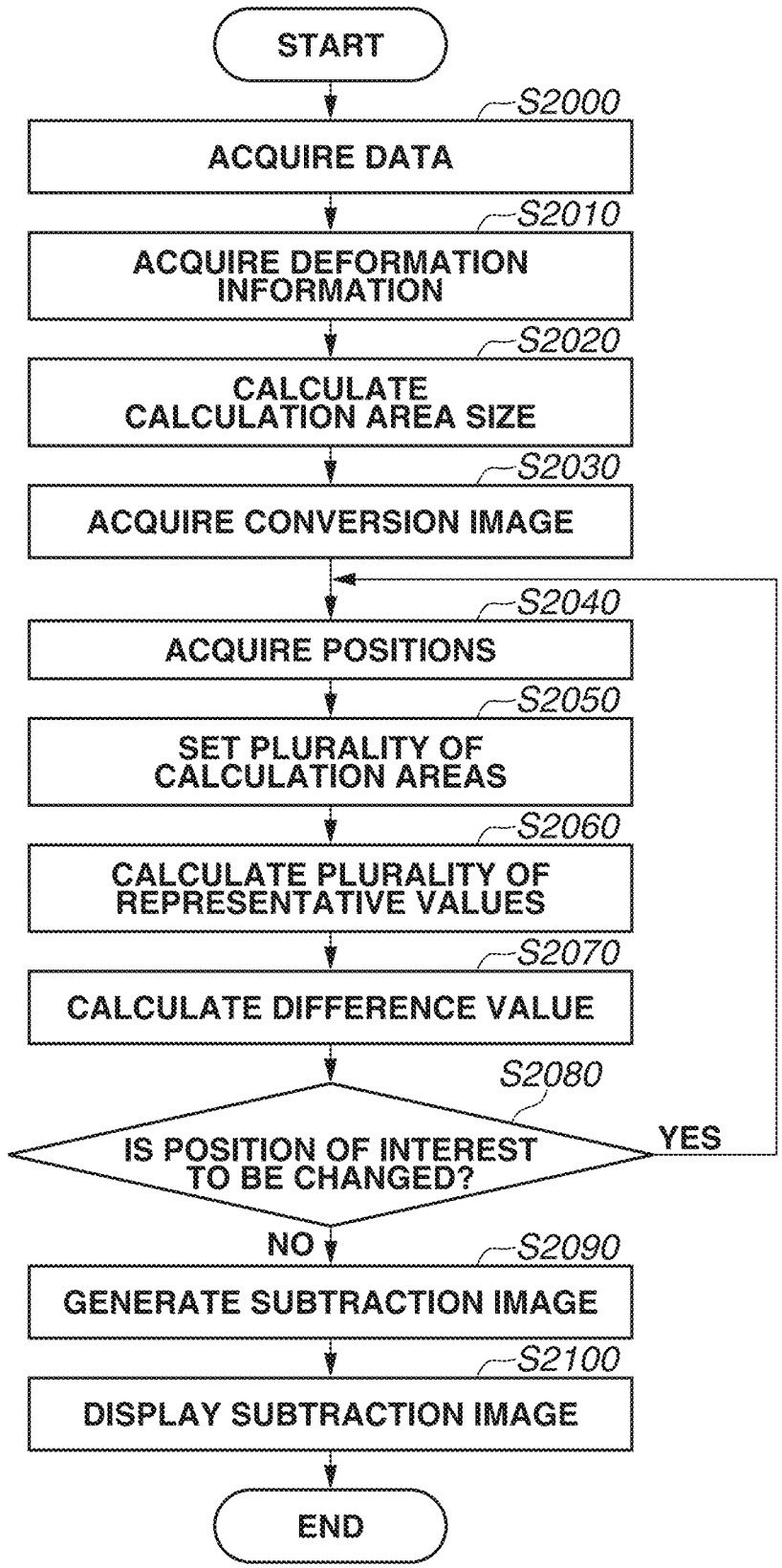
FIG. 2 is a flowchart illustrating an entire processing procedure according to the first exemplary embodiment.
Figure 3:
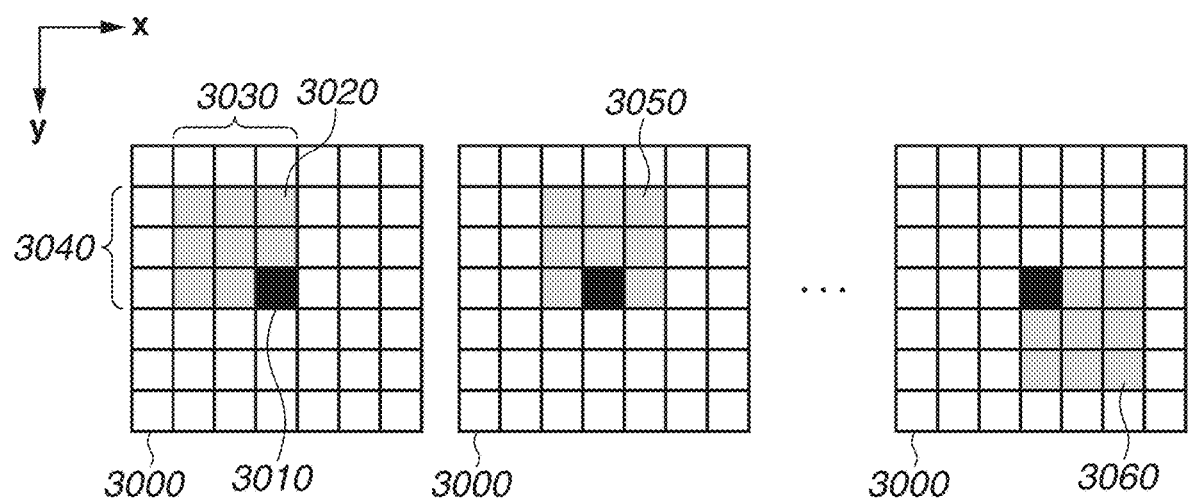
FIG. 3 is a diagram illustrating a method for setting calculation areas according to the first exemplary embodiment.

Consequently, the image processing apparatus can approximately acquire a density value calculated from a corresponding area on the small pixel image having the same size as that of a single pixel in the large pixel image. Thus, the image processing apparatus can generally match the roughness of the images when calculating the difference between the larger and small pixel images. Further, when calculating the difference, the image processing apparatus acquires the calculation area to which the representative value closest to the density value at the position of interest (or the corresponding position) belongs, and thereby can calculate the difference from the corresponding area on the small pixel image that matches a reconfiguration condition for the large pixel image (the positions of discretization of signal data) most. Consequently, a user can observe a three-dimensional subtraction image in which an artifact occurring due to the differences in pixel size and reconfiguration condition is reduced. With reference to FIGS. 1 to 3, the configuration and the processing of the present exemplary embodiment will be described below.

First, with reference to FIG. 8, an example of the hardware configuration of the image processing apparatus according to the present exemplary embodiment is described. The hardware configuration of the present exemplary embodiment is merely an example, and the image processing apparatus may include hardware other than this hardware configuration. FIG. 8 is a block diagram illustrating an example of the configuration of an image processing system (also referred to as a "medical image processing system") including the image processing apparatus according to the present exemplary embodiment. The image processing system includes an image processing apparatus 100, a network 21, and a data server 110, which includes a database 22. The image processing apparatus 100 is connected to the data server 110 via the network 21 such that the image processing apparatus 100 can communicate with the data server 110. The network 21 includes, for example, a local area network (LAN) and a wide area network (WAN).

The data server 110 holds first and second images specified by the user as targets between which a subtraction image is to be generated. The first and second images are three-dimensional tomographic images (volume data) obtained by imaging a subject in advance with the same modality in different conditions (the date and time, a contrast condition, and an imaging parameter). The modality for capturing the three-dimensional tomographic images may be a magnetic resonance imaging (MRI) apparatus, an X-ray CT apparatus, a three-dimensional ultrasonic imaging apparatus, a photoacoustic tomography apparatus, a positron emission tomography (PET) apparatus, a single-photon emission computed tomography (SPECT) apparatus, or an optical coherence tomography (OCT) apparatus. Alternatively, the first and second images may be images obtained by imaging the same patient in the same posture with the same modality at different dates and times for a follow-up, or may be images obtained by imaging the same patient in different contrast conditions or with different imaging parameters. Yet alternatively, the first and second images may be images obtained by imaging different patients, or may be an image of a patient and a standard image. The standard image is, for example, an image generated from average information (pixel values and part information) acquired from images of many patients. The image processing apparatus 100 can acquire an image held in the database 22 via the network 21.

The image processing apparatus 100 includes a communication interface (IF) 31 (a communication unit), a read-only memory (ROM) 32, a random-access memory (RAM) 33, a storage unit 34, an operation unit 35, a display unit 120, and a control unit 37.

The communication IF 31 (the communication unit) is composed of a LAN card and achieves communication between an external apparatus (e.g., the data server 110) and the image processing apparatus 100. The ROM 32 is composed of a non-volatile memory and stores various programs. The RAM 33 is composed of a volatile memory and temporarily stores various pieces of information as data. The storage unit 34 is composed of a hard disk drive (HDD) and stores various pieces of information as data. The operation unit 35 includes a keyboard, a mouse, and a touch panel and inputs an instruction from the user (e.g., a doctor) to various apparatuses.

The display unit 120 is a monitor including a display and for displaying an image generated by the image processing apparatus 100. The control unit 37 includes a central processing unit (CPU) and performs overall control of the processing of the image processing apparatus 100. The control unit 37 operates as a function unit for executing functions illustrated in FIG. 1.

FIG. 1 illustrates the configuration of the image processing apparatus according to the present exemplary embodiment. As illustrated in FIG. 1, the image processing apparatus 100 according to the present exemplary embodiment is connected to the data server 110 and the display unit 120.

The control unit 37 of the image processing apparatus 100 functions as the following components. A data acquisition unit 1010 acquires first and second images input to the image processing apparatus 100. A deformation information acquisition unit 1020 acquires deformation information indicating the correspondence relationship between positions on the first and second images. Based on the pixel size of a large pixel image, a calculation area size calculation unit 1030 calculates a calculation area size. A conversion image acquisition unit 1040 acquires a conversion image obtained by converting the pixel size of a small pixel image. A position acquisition unit 1050 acquires a position of interest on the first image, and using the deformation information acquired by the deformation information acquisition unit 1020, acquires a corresponding position on the second image corresponding to the position of interest. A calculation area setting unit 1060 sets a plurality of calculation areas having the calculation area size by including the corresponding position (or the position of interest) on the conversion image. Based on the density value of a pixel at the position of interest (or the corresponding position) on the large pixel image and the density values of pixels in the plurality of calculation areas on the conversion image, a difference calculation unit 1070 calculates a difference value at the position of interest. A subtraction image generation unit 1080 generates a subtraction image of which the density value at the position of interest is the calculated difference value. A display control unit 1090 performs display control to display the first and second images and the subtraction image next to each other on the display unit 120.

FIG. 2 illustrates a flowchart for an entire processing procedure performed by the image processing apparatus 100.

(S2000) (Acquire Data)

In step S2000, the data acquisition unit 1010 acquires first and second images input to the image processing apparatus 100. That is, this process corresponds to an example of an image acquisition unit configured to acquire a first image and a second image having a pixel size smaller than a pixel size of the first image. Further, this process corresponds to an example of an image acquisition unit configured to acquire a first image and a second image having a pixel size larger than a pixel size of the first image. Then, the data acquisition unit 1010 outputs the acquired first and second images to the conversion image acquisition unit 1040, the deformation information acquisition unit 1020, and the difference calculation unit 1070. Further, the data acquisition unit 1010 outputs information regarding the pixel sizes of the first and second images to the calculation area size calculation unit 1030.

(Step S2010) (Acquire Deformation Information)

In step S2010, the deformation information acquisition unit 1020 acquires deformation information for approximately matching pixels representing the same part between the first and second images. That is, the deformation information acquisition unit 1020 performs a registration process (a deformation estimation process) between the first and second images. Then, the deformation information acquisition unit 1020 outputs the acquired deformation information to the position acquisition unit 1050.

In the present exemplary embodiment, the deformation information is obtained by a known image processing technique. For example, the deformation information is obtained by deforming one of the images such that the degree of similarity between the images after the deformation is high. As the degree of similarity between the images, any of known methods such as the sum of squared difference (SSD), mutual information, and a cross-correlation coefficient, which are generally used, can be employed. Further, as a model for the deformation of the image, there is a deformation model based on a radial basis function such as a thin plate spline (TPS). Alternatively, a known deformation model based on free-form deformation (FFD) or large deformation diffeomorphic metric mapping (LDDMM) can be used. If there are only differences in position and orientation between the first and second images (the first and second images can be approximated to each other such that there are only differences in position and orientation between the first and second images), the deformation information acquisition unit 1020 may perform rigid registration between the images and acquire conversion parameters for the positions and the orientations as the deformation information. Alternatively, the deformation information acquisition unit 1020 may acquire an affine transformation parameter between the images as the deformation information. Further, if there is no positional shift between the images (the images can be approximated to each other such that there is no positional shift between the images), the process of this step is not necessary.

(Step S2020) (Calculate Calculation Area Size)

In step S2020, to perform a smoothing process for approximating the pixel size of a small pixel image to the pixel size of a large pixel image, the calculation area size calculation unit 1030 calculates a calculation area size. Then, the calculation area size calculation unit 1030 outputs the calculated calculation area size to the calculation area setting unit 1060.

In the present exemplary embodiment, the size of an area represented by a single pixel in each of the larger and small pixel images differs, and an area that can be represented by a single pixel in the small pixel image is smaller. A calculation area size for a smoothing process for approximating an image having a large pixel size is set such that the roughness of images generally match each other. That is, the calculation area size calculation unit 1030 calculates the calculation area size so that the size of a single pixel in the large pixel image and the size of a corresponding area on the small pixel image are equal to each other. This corresponds to an example of an area size calculation unit configured to, based on the pixel size of the first image, calculate an area size of a calculation area to be set on the second image. Further, this corresponds to an example of an area size calculation unit configured to, based on the pixel size of the second image, calculate an area size of a calculation area to be set on the first image. The calculation area size may not necessarily be the size of a single pixel in the large pixel image so long as areas having the same size can be set on the larger and small pixel images. The calculation area size may be calculated so that the calculation area size is the same size as a predetermined number of pixels in the large pixel image.

In the present exemplary embodiment, the calculation area size is the same size as the pixel size of the large pixel image. Alternatively, the size may be changed with respect to each axis. For example, in a general CT image, the pixel size in a slice (in x- and y-directions) is often sufficiently small. Thus, the configuration may be such that an artifact is not reduced in the x- and y-directions. In this case, the calculation area size in the x-axis and y-axis directions may be set to 0, i.e., may not be subjected to the smoothing process, and only the calculation area size in a z-axis direction may be calculated by the above method. According to this, it is possible to speed up the calculations.

(Step S2030) (Acquire Conversion Image)

In step S2030, the conversion image acquisition unit 1040 converts the small pixel image such that the pixel size of the large pixel image, i.e., the calculation area size, is an odd multiple of the pixel size of the small pixel image. That is, this process corresponds to an example of a pixel size conversion unit configured to convert the pixel size of the second image such that the pixel size of the first image is an odd multiple of the pixel size of the second image. Further, this process corresponds to an example of a pixel size conversion unit configured to convert the pixel size of the first image such that the pixel size of the second image is an odd multiple of the pixel size of the first image. Then, the conversion image acquisition unit 1040 outputs the converted small pixel image to the position acquisition unit 1050, the calculation area setting unit 1060, and the difference calculation unit 1070.

Generally, the kernel size of the smoothing process to be performed at the subsequent stage includes an odd number of pixels. Thus, the conversion image acquisition unit 1040 converts the pixel size of the small pixel image such that the calculation area size as the kernel size is an odd multiple of the pixel size of the small pixel image. Consequently, it is possible to place a kernel having the calculation area size in the conversion image with a pixel as a processing target at the center. As a more specific method, the pixel size of the conversion image can be obtained such that the pixel size of the large pixel image is an odd multiple of the pixel size of the conversion image, and the pixel size of the conversion image is the pixel size closest to the pixel size of the small pixel image among sizes smaller than the pixel size of the small pixel image. For example, the pixel size of the conversion image in a case where the pixel size of the large pixel image is 1.5 mm, 1.5 mm, and 3.0 mm in the x-axis, y-axis, and z-axis directions, respectively, the calculation area size is the same size as the pixel size of the large pixel image, and the pixel size of the small pixel image is 0.7 mm, 0.7 mm, and 2 mm in the x-axis, y-axis, and z-axis directions, respectively will be described. In this case, for example, the pixel size of the small pixel image is converted so that the pixel size of the conversion image is 0.5 mm, 0.5 mm, and 1.0 mm in the x-axis, y-axis, and z-axis directions, respectively.

If the pixel size of the large pixel image is an odd multiple of the pixel size of the small pixel image, the process of this step can be omitted. In this case, the small pixel image is set as the conversion image, and the processing proceeds to step S2040.

(Step S2040) (Acquire Positions)

In step S2040, if the pixel size of the first image is larger than that of the second image, the position acquisition unit 1050 acquires a position of interest on the first image (the large pixel image). Then, using the deformation information, the position acquisition unit 1050 acquires a position, corresponding to the position of interest, on the conversion image obtained by converting the pixel size of the second image (the small pixel image). If, on the other hand, the pixel size of the second image is larger than that of the first image, the position acquisition unit 1050 acquires a position of interest on the conversion image obtained by converting the pixel size of the first image (the small pixel image). Then, using the deformation information, the position acquisition unit 1050 acquires a position, corresponding to the position of interest, on the second image (the large pixel image). The position acquisition unit 1050 outputs the acquired positions to the calculation area setting unit 1060 and the difference calculation unit 1070.

In the present exemplary embodiment, the distance between the positions where the position of interest is acquired may be determined as follows. The position of interest may be acquired at the positions of pixels in the large pixel image according to the pixel size of the large pixel image, or may be acquired at the distance between pixels of the pixel size of the small pixel image or the conversion image. For example, if the position of interest is acquired at the distance between pixels in an image having a small pixel size, the pixel size of a subtraction image to be generated at the subsequent stage is also small. Thus, it is possible generate a subtraction image having high sharpness. If, on the other hand, the position of interest is acquired at the distance between pixels in an image having a large pixel size, the pixel size of a subtraction image is large, and therefore, the number of pixels in the subtraction image is small. Thus, it is possible to reduce the use space of the data server 110. In this case, the distance between the positions where the position of interest is acquired may be determined in advance based on the pixel size so that the position of interest is acquired at the distance between pixels in an image having a smaller pixel size. Alternatively, the position of interest may be acquired according to the pixel size of an image in which the user is most interested. If the position of interest is acquired according to the pixel size of an image in which the user is most interested, and when the image in which the user is interested and a generated subtraction image are contrasted next to each other, the user can observe these images in the same coordinate system. Thus, it is easy to grasp positions on the images corresponding to each other.
(Step S2050) (Set Plurality of Calculation Areas)

In step S2050, the calculation area setting unit 1060 sets calculation areas having the calculation area size calculated in step S2020 at a plurality of positions by including the corresponding position (or the position of interest) on the conversion image. That is, this process corresponds to an example of a calculation area setting unit configured to set on the second image the plurality of calculation areas including a corresponding position on the second image corresponding to a position of interest on the first image, the plurality of calculation areas having the calculated area size. Further, this process corresponds to an example of a calculation area setting unit configured to set on the first image the plurality of calculation areas including a position of interest on the first image and having the calculated area size. Then, the calculation area setting unit 1060 outputs information about the plurality of set calculation areas to the difference calculation unit 1070.

In the present exemplary embodiment, if the first image is the large pixel image, position information alone about the position of interest on the large pixel image and the corresponding position on the conversion image does not allow an area corresponding to a pixel at the position of interest on the large pixel image to be identified on the conversion image. This is because the density value of a pixel to be generated varies depending on the position where a modality discretizes signal data when reconfiguring an image, and it is not possible to specify, from the image, at which position the signal data is discretized to generate the pixel at the position of interest on the large pixel image. Thus, the image processing apparatus needs to set calculation areas at a plurality of positions that, when the conversion image is regarded as signal data, can be the positions of discretization of the signal data, and to obtain in an exploratory manner the position of discretization corresponding to the pixel at the position of interest on the large pixel image.

On the other hand, also if the first image is the small pixel image, similarly, an area corresponding to a pixel at the corresponding position on the large pixel image cannot be identified on the conversion image. Thus, it is necessary to set calculation areas at a plurality of positions that, when the conversion image is regarded as signal data, can be the positions of discretization of the signal data, and to obtain in an exploratory manner the position of discretization corresponding to the pixel at the corresponding position on the large pixel image.

FIG. 3 illustrates examples of the positions where a plurality of calculation areas are set on the conversion image in a case where the first image is the large pixel image, and the second image is the small pixel image. In FIG. 3, an image 3000 represents a cross-sectional image of the conversion image taken along an x-y plane. The calculation area setting unit 1060 sets a calculation area 3020 by including a corresponding position 3010, which corresponds to the position of interest on the large pixel image. A size 3030 in the x-direction of the calculation area 3020 is a size that is the same as a single pixel size in the x-direction of the large pixel image. A size 3040 in the y-direction of the calculation area 3020 is a size that is the same as a single pixel size in the y-direction of the large pixel image. That is, in FIG. 3, the relationship between the pixel size of the large pixel image and the pixel size of the small pixel image is such that the pixel size of the large pixel image is three times as large as the pixel size of the small pixel image both in the x-axis and y-axis directions. A calculation area 3050 is a calculation area set at a position obtained by shifting the position of the calculation area 3020 by a single pixel in the x-direction. Further, calculation areas can be set by shifting the positions of the calculation areas not only in the x-direction but also in the y-direction. For example, a calculation area 3060 is a calculation area set by shifting the calculation area 3020 by three pixels in each of the x- and y-directions. In this case, a plurality of calculation areas are set by shifting the positions of the calculation areas in pixel units. Alternatively, calculation areas can also be set at any positions. Further, calculation areas may be set not by shifting the positions of the calculation areas by each pixel as described above, but by shifting the positions of the calculation areas by every predetermined pixels. Further, the positions of a plurality of calculation areas may be randomly set. Consequently, it is possible to reduce the number of calculation areas to be set, and speed up the processing. In FIG. 3, for ease of illustration, a two-dimensional image is used. In an actual three-dimensional image, however, calculation areas can be set at a plurality of positions not only in the x- and y-directions but also in the z-direction.

(Step S2060) (Calculate Plurality of Representative Values)

In step S2060, the difference calculation unit 1070 calculates a representative value in each of the plurality of calculation areas set on the conversion image. That is, this process corresponds to an example of a representative value calculation unit configured to, in each of the plurality of set calculation areas, calculate a representative value based on density values of pixels included in the calculation area.

The representative value in each calculation area may be the average value of the density values of all the pixels in the calculation area on the conversion image, or may be the average value of the density values of pixels randomly sampled in the calculation area. The average value can be calculated by a filter process, using a kernel having a size that is the same as the calculation area size. The average value may be a value obtained by uniformly averaging the density values of pixels in the calculation area, or may be the value of the weighted average calculated by giving a large weight to the density value of a pixel at a position close to the center of the calculation area, e.g., a Gaussian filter. Alternatively, any smoothing process may be used. Normally, when continuous signal data obtained from a subject, such as a CT image, is converted into discretized density values, the value of the weighted average of signal data of a predetermined section, e.g., the pixel size or the slice thickness in the surface of a slice image, is used. That is, a pixel in the large pixel image is generated by averaging signal data in a wider range than a pixel in the small pixel image. Thus, the density values of pixels in an area on the small pixel image having the same size as a single pixel in the large pixel image are smoothed, whereby it is possible to approximately obtain a density value generated from an area having the same size as a single pixel in the large pixel image.

(Step S2070) (Calculate Difference Value)

In step S2070, based on the density value at the position of interest (or the corresponding position) on the large pixel image and the representative value in each of the calculation areas on the conversion image, the difference calculation unit 1070 calculates a difference value at the position of interest. That is, this process corresponds to an example of a difference unit configured to, based on a density value of a pixel at the position of interest and the plurality of calculated representative values, determine a difference value between the first and second images at the position of interest. Further, this process corresponds to an example of a difference unit configured to, based on a density value of a pixel at a corresponding position on the second image corresponding to the position of interest and the plurality of calculated representative values, determine a difference value between the first and second images at the position of interest. Then, the difference calculation unit 1070 outputs the calculated difference value to the subtraction image generation unit 1080.

In the present exemplary embodiment, if the first image is the large pixel image, the difference calculation unit 1070 calculates a difference value between the density value at the position of interest (or the corresponding position) on the large pixel image and each of the plurality of density values (the representative values) in a case where the position of the area to be discretized (the calculation area) on the conversion image is changed. Then, the difference calculation unit 1070 selects a corresponding area where the difference is the smallest (the representative value is the closest to the density value at the position of interest (or the corresponding position) on the large pixel image). Then, using this representative value, the difference calculation unit 1070 calculates the difference between the representative value and the density value of the large pixel image and thereby can correct the difference between the density values due to the difference in pixel size to calculate a difference value between pixels in the images. Consequently, it is possible to calculate the difference between an area discretized when generating the pixel at the position of interest (or the corresponding position) on the large pixel image and an area on the conversion image that matches the discretized area most. That is, this process corresponds to an example of the difference unit configured to determine the difference value based on a difference between the density value of the pixel at the position of interest and each of the plurality of representative values. More specifically, this process corresponds to an example of the difference unit configured to determine, as the difference value between the first and second images at the position of interest, a difference value between a representative value having a small difference from the density value of the pixel at the position of interest among the plurality of representative values and the density value of the pixel at the position of interest. Further, this process corresponds to an example of the difference unit configured to determine the difference value based on a difference between the density value of the pixel at the corresponding position and each of the plurality of representative values. More specifically, this process corresponds to an example of the difference unit configured to determine, as the difference value between the first and second images at the position of interest, a difference value between a representative value having a small difference from the density value of the pixel at the corresponding position among the plurality of representative values and the density value of the pixel at the corresponding position.

If, on the other hand, the first image is the small pixel image, the difference calculation unit 1070 similarly calculates the difference value by replacing the position of interest on the above large pixel image with the corresponding position. Thus, it is possible to calculate the difference between an area discretized when generating the pixel at the corresponding position on the large pixel image and an area on the conversion image that matches the discretized area most.

In the present exemplary embodiment, the representative value in each calculation area is obtained as follows. A plurality of density values in the calculation area are approximately regarded as signal data obtained by capturing the image, and the representative value is calculated from the signal data. That is, it is desirable that a method for calculating the representative value from the signal data should be similar to a method for actually generating the density value of the large pixel image from the signal data. That is, if a reconfiguration algorithm for the large pixel image is known, the representative value in the calculation area may be calculated according to the algorithm.

In a case where similar processes are performed on a plurality of positions (positions of interest or corresponding positions) on the large pixel image, pixels at the plurality of positions (first and second positions) may be associated with the same calculation area (a first calculation area) on the small pixel image. For example, if a difference value between the density value at the first position and the representative value in the first calculation area is smaller than a difference value between the density value at the second position and the representative value in the first calculation area, the first position can be associated with the first calculation area. Then, another calculation area where the difference value between the calculation area and the second position is the smallest except for the first calculation area is searched for, and the second position can be associated with the found calculation area. If the pixel size of the first image is larger than that of the second image, the position of interest closer to the center of the first calculation area between a first corresponding position corresponding to a first position of interest and a second corresponding position corresponding to a second position of interest may be associated with the first calculation area. Alternatively, in order that the sum of the amounts of shift between positions corresponding to positions of interest and the centers of calculation areas is small in the entirety of an image, the corresponding positions may be associated with the calculation areas.

(Step S2080) (Is Position of Interest to Be Changed?)

In step S2080, the position acquisition unit 1050 determines whether the difference values at all the positions on the first image (or the conversion image) are calculated. If the difference values at all the positions are calculated (Yes in step S2080), the processing proceeds to step S2090. If, on the other hand, the difference values at all the positions are not acquired (No in step S2080), the processing returns to step S2040.

In the present exemplary embodiment, not the difference values at all the positions on the first image (or the conversion image), but the difference values at some positions on the first image (or the conversion image) extracted in advance by a known image processing technique may be calculated. Consequently, it is possible to reduce the processing time required to reduce an artifact.

(Step S2090) (Generate Subtraction Image)

In step S2090, the subtraction image generation unit 1080 generates a subtraction image (a first subtraction image) of which the density value is the difference value at each position of interest on the first image (or the conversion image). Then, the subtraction image generation unit 1080 saves the obtained subtraction image in the data server 110. Further, the subtraction image generation unit 1080 outputs the obtained subtraction image to the display control unit 1090. The subtraction image generation unit 1080 may also generate a general subtraction image (a second subtraction image) of which the density value is a second difference value calculated in step S2070 (the difference value between the density value at the position of interest on the first image (or the conversion image) and the density value at the corresponding position on the second image).

In the present exemplary embodiment, the pixel size of the subtraction image may be the same as that of the small pixel image, or may be the same as that of the conversion image.

(Step S2100) (Display Subtraction Image)

In step S2100, the display control unit 1090 performs control to display the subtraction image generated in step S2090 (the first subtraction image) on the display unit 120.

As an example of the display, for example, the first image, the second image, and the subtraction image may be displayed next to each other by dividing a single screen vertically or horizontally. Alternatively, the subtraction image (the first subtraction image) drawn in a color different from that of the first image or the second image may be displayed in a superimposed manner. Yet alternatively, only any one of the first image, the second image, and the subtraction image may be able to be selected (freely switched at the same position) and displayed. Yet alternatively, the images may be displayed by, according to the pixel size of any of the images, enlarging or reducing the other images. Yet alternatively, the first image, the second images, and the subtraction image may be displayed next to each other such that a corresponding position on the second image corresponding to a single position of interest on the first image matches a position of interest on the subtraction image. Yet alternatively, the first and second subtraction images may be able to be displayed by switching the first and second subtraction images.

In the above manner, the processing of the image processing apparatus 100 is performed.

Based on the above, in a case where one of images has a smaller pixel size than the other image in each of the x-axis, y-axis, and z-axis directions, it is possible to match the sizes of areas where density values are calculated, correct the difference between the density values occurring due to the differences in pixel size and reconfiguration condition, and calculate the difference between the images. Consequently, the user can observe a subtraction image on which an artifact is reduced.

(Variation 1-1) (Smoothing Method not on Pixel Basis)

In the present exemplary embodiment, the image obtained by converting the pixel size of the small pixel image is smoothed such that the pixel size of the large pixel image is an odd multiple of the pixel size of the small pixel image. The pixel size, however, may not necessarily be converted. For example, a first area having a size that is the same as the pixel size of the large pixel image may be set around a pixel as a smoothing target on the small pixel image, and according to the volume ratio of pixels included in the first area, the density values of the pixels included in the first area may be subjected to a smoothing process. More specifically, if a pixel in the small pixel image is completely included in the first area, a weight coefficient related to the density value of the pixel is set to 1. If, on the other hand, only half the pixel is included in the first area, the weight coefficient related to the density value of the pixel is set to 0.5. Then, it is possible to acquire a second smoothed image of which the density value is the weighted average value of the density values of all the pixels included in the first area. According to this, it is possible to obtain equivalent effects without converting the pixel size of the small pixel image such that the pixel size of the large pixel image is an odd multiple of the pixel size of the small pixel image.

In the first exemplary embodiment, the pixel size of one of images is smaller than or the same as that of the other image in each of the x-axis, y-axis, and z-axis directions. An image processing apparatus according to a second exemplary embodiment generates a three-dimensional subtraction image between first and second images such that the pixel size of the first image is smaller in one axial direction, and the pixel size of the second image is smaller in another axial direction.

In the second exemplary embodiment, in each axial direction, an image having a smaller pixel size is set as a small pixel image, and an image having a larger pixel size is set as a large pixel image. For example, if a first image has a smaller pixel size in the x-direction, and a second image has a smaller pixel size in the y-direction, the first image is processed as a small pixel image in the x-direction, and the second image is processed as a small pixel image in the y-direction.

The configuration of the image processing apparatus according to the present exemplary embodiment is similar to that according to the first exemplary embodiment. However, the functions of a conversion image acquisition unit 1040, a position acquisition unit 1050, a calculation area setting unit 1060, and a difference calculation unit 1070 are different from those in the first exemplary embodiment, and therefore are described below. The functions of other components are similar to those in the first exemplary embodiment, and therefore are not described here.

The image processing apparatus 100 includes the following components. A conversion image acquisition unit 1040 acquires first and second conversion images obtained by converting the pixel sizes of the first and second images. A position acquisition unit 1050 acquires a position of interest on the first conversion image, and using the deformation information acquired by the deformation information acquisition unit 1020, acquires a corresponding position on the second conversion image corresponding to the position of interest on the first conversion image. A calculation area setting unit 1060 sets a plurality of calculation areas having the calculation area size by including the position of interest on the first conversion image and sets a plurality of calculation areas having the calculation area size by including the corresponding position on the second conversion image. Based on the density values of pixels in the plurality of calculation areas on the first conversion image and the density values of pixels in the plurality of calculation areas on the second conversion image, a difference calculation unit 1070 calculates a difference value at the position of interest.

FIG. 4 illustrates a flowchart for an entire processing procedure to be performed by the image processing apparatus 100. The processes of steps S4000, S4010, and S4100 are similar to those of steps S2000, S2010, and S2100, respectively, in the first exemplary embodiment, and therefore are not described here. Only the differences from the flowchart in FIG. 2 are described below.

(Step S4020) (Calculate Calculation Area Size)

In step S4020, based on the pixel size of a large pixel image, the calculation area size calculation unit 1030 calculates a calculation area size to be used to calculate a difference value. Then, the calculation area size calculation unit 1030 outputs the calculated calculation area size to the calculation area setting unit 1060.

In the present exemplary embodiment, an image having a larger pixel size differs in each axial direction. Thus, the calculation area size in each axial direction is set to a size that is the same as each of the larger of the pixel sizes of the first and second images. That is, this process corresponds to an example of an area size calculation unit configured to, at least in a case where a pixel size of the first image is larger than a pixel size of the second image in a first axis based on which an image is obtained, and the pixel size of the second image is larger than the pixel size of the first image in a second axis, then based on the pixel size of the image having the larger pixel size than the other image in each of the axes, calculate a size of a calculation area.

(Step S4030) (Acquire Conversion Images)

In step S4030, the conversion image acquisition unit 1040 acquires a first conversion image obtained by converting the pixel size of the first image such that the pixel size of the large pixel image is an odd multiple of the pixel size of the small pixel image in each axial direction. Further, similarly, the conversion image acquisition unit 1040 acquires a second conversion image obtained by converting the pixel size of the second image. Then, the conversion image acquisition unit 1040 outputs the acquired conversion images to the calculation area setting unit 1060 and the difference calculation unit 1070.

In the present exemplary embodiment, the pixel sizes are converted such that the pixel size of either of the first and second conversion images is an odd multiple of the pixel size of the other in each axial direction. Further, the pixel size of the image having the smaller pixel size is converted in each axial direction. As an example, the pixel sizes of the conversion images in a case where the pixel size of the first image is 1.5 mm, 1.5 mm, and 2 mm in the x-axis, y-axis, and z-axis directions, respectively, and the pixel size of the second image is 1.0 mm, 1.0 mm, and 3 mm in the x-axis, y-axis, and z-axis directions, respectively will be described. In this case, in the x-axis and y-axis directions, the pixel size of the second image, which is the image having the smaller pixel size, is converted. For example, to obtain the pixel size closest to 1.0 mm such that that the pixel size of the large pixel image is an odd multiple of the pixel size of the small pixel image, the pixel size of the second image is set to 0.5 mm. In the z-axis direction, the pixel size of the first image, which has the smaller pixel size, is converted. By a method similar to that in the x-axis and y-axis directions, the converted pixel size in the z-axis direction is determined as 1 mm. That is, in the above example, the first conversion image is generated by converting the pixel size of the first image to 1.5 mm, 1.5 mm, and 1 mm in the x-axis, y-axis, and z-axis directions, respectively. Then, the second conversion image is generated by converting the pixel size of the second image to 0.5 mm, 0.5 mm, and 3 mm in the x-axis, y-axis, and z-axis directions, respectively.

(Step S4040) (Acquire Positions)

In step S4040, the position acquisition unit 1050 acquires a position of interest on the first conversion image, and using the deformation information acquired in step S4010, acquires a corresponding position on the second conversion image corresponding to the position of interest. Then, the position acquisition unit 1050 outputs the acquired positions to the calculation area setting unit 1060 and the difference calculation unit 1070.

(Step S4050) (Set Plurality of Calculation Areas)

In step S4050, similarly to the first exemplary embodiment, the calculation area setting unit 1060 sets calculation areas at a plurality of positions that, when the first and second conversion images are regarded as signal data, can be the positions of discretization of the signal data. That is, the calculation area setting unit 1060 sets calculation areas having the calculation area size calculated in step S4020 at a plurality of positions by including the position of interest on the first conversion image and the corresponding position on the second conversion image. Then, the calculation area setting unit 1060 outputs information about the plurality of set calculation areas to the difference calculation unit 1070.

Figure 5A:
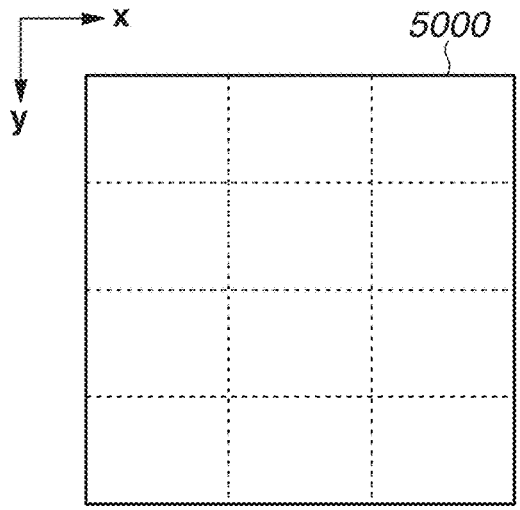
FIGS. 5A, 5B, 5C, and 5D are diagrams illustrating a method for calculating a difference value according to the second exemplary embodiment.
Figure 5B:
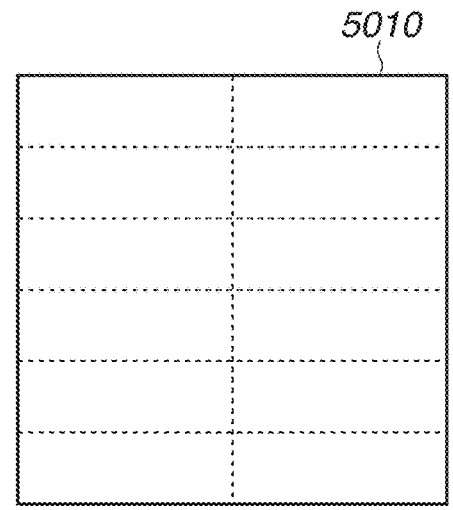
Figure 5C:
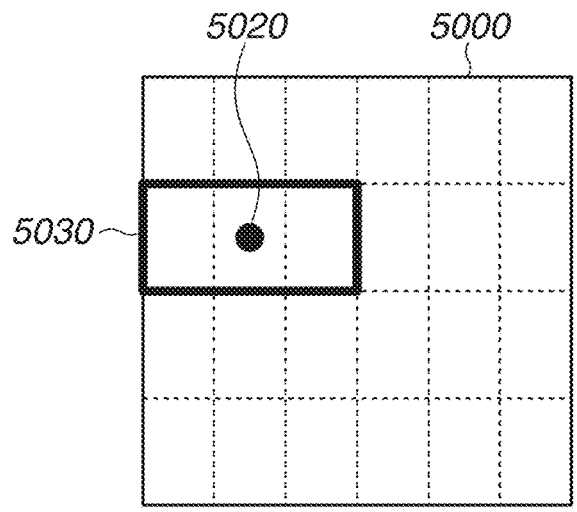
Figure 5D:
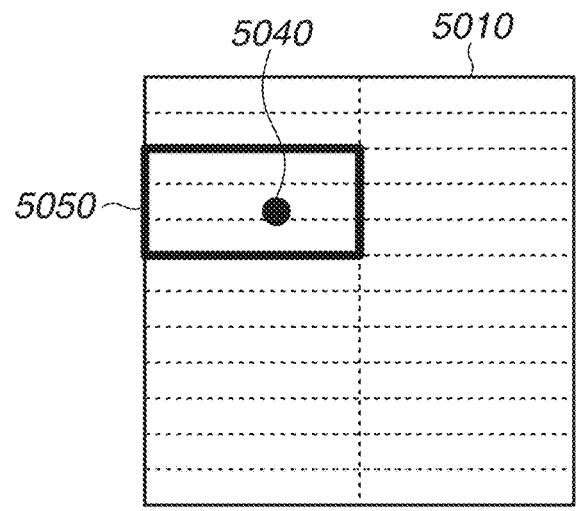

With reference to FIGS. 5A, 5B, 5C, and 5D, this process is specifically described. In FIGS. 5A and 5B, rectangular areas 5000 and 5010 represent areas of the first and second images, respectively, obtained by dividing pixels based on a physical size (mm). Rectangles formed of dotted lines in each area indicates areas represented by pixels. That is, in FIGS. 5A, 5B, 5C, and 5D, the first image has a larger pixel size than the second image in the y-axis direction and has a smaller pixel size than the second image in the x-axis direction. FIG. 5C illustrates areas represented by pixels in the first conversion image in the rectangular area 5000. A single calculation area 5030 is set by including a position of interest 5020. In FIG. 5D, in the rectangular area 5010, a single calculation area 5050 is set by including a corresponding position 5040. FIGS. 5C and 5D each illustrate a single calculation area for ease of illustration. However, similarly to the first exemplary embodiment, it is necessary to set, on a small pixel image, calculation areas at a plurality of positions that, when the first and second conversion images are regarded as signal data, can be the positions of discretization of the signal data. In the present exemplary embodiment, a plurality of calculation areas are set on a small pixel image in each axial direction. Specifically, in the first conversion image, calculation areas are set by shifting the positions of the calculation areas in the axial direction (the x-direction) in which the pixel size of the first conversion image is smaller than that of the second conversion image. That is, a plurality of calculation areas are set by shifting the position of the calculation area 5030 in the x-axis direction in the pixel units of the small pixel image in the x-axis direction (the first conversion image) by including the position of interest 5020. Consequently, it is possible to set, in the x-direction, calculation areas at a plurality of positions that can be the positions of discretization on the first conversion image regarded as signal data. Similarly, also in the second conversion image, calculation areas are set by shifting the positions of the calculation areas in the axial direction (the y-direction) in which the pixel size of the second conversion image is smaller than that of the first conversion image. That is, a plurality of calculation areas are set by shifting the position of the calculation area 5050 in the y-axis direction in the pixel units on the small pixel image in the y-axis direction (the second conversion image) by including the corresponding position 5040. Consequently, it is possible to set, also in the y-direction, calculation areas at a plurality of positions that can be the positions of discretization. That is, this process corresponds to an example of a calculation area setting unit configured to set on the first image the plurality of calculation areas including a position of interest on the first image and having the calculated area size, and also set on the second image the plurality of calculation areas including a corresponding position on the second image corresponding to the position of interest, the plurality of calculation areas having the calculated area size.

(Step S4060) (Calculate Plurality of Representative Values)

In step S4060, the difference calculation unit 1070 calculates a representative value in each of the plurality of calculation areas set on the first conversion image and the plurality of calculation areas set on the second conversion image. That is, this process corresponds to an example of a representative value calculation unit configured to, in each of the plurality of calculation areas set on the first image, calculate a first representative value based on density values of pixels included in the calculation area, and in each of the plurality of calculation areas set on the second image, calculate a second representative value based on density values of pixels included in the calculation area.

The representative value in each of the plurality of calculation areas on the first conversion image and the representative value in each of the plurality of calculation areas on the second conversion image can be calculated by a method similar to that for calculating the representative value in each of the plurality of calculation areas on the conversion image in the first exemplary embodiment.

(Step S4070) (Calculate Difference Value)

In step S4070, based on the plurality of representative values on the first conversion image and the plurality of representative values on the second conversion image acquired in step S4060, the difference calculation unit 1070 calculates a difference value to be given to a subtraction image. Then, the difference calculation unit 1070 outputs the calculated difference value to the subtraction image generation unit 1080. That is, this process corresponds to an example of a difference unit configured to, based on a difference between each of the plurality of first representative values and each of the plurality of second representative values, determine a difference value between the first and second images at the position of interest.

The difference value is obtained by calculating a value having the smallest difference from among the combinations of the plurality of representative values on the first conversion image and the plurality of representative values on the second conversion image. Consequently, the calculation areas to which the representative value on the first conversion image and the representative value on the second conversion image having the smallest difference belong can be set as corresponding areas. Then, also in a case where the pixel size of the first image is smaller only in one axial direction, and the pixel size of the second image is smaller only in another axial direction, it is possible to reference areas having the same size between the images. Thus, it is possible to correct the difference between the density values due to the difference in pixel size and calculate a difference value between pixels in the images.

In the present exemplary embodiment, the smallest difference value is calculated from among the combinations of the plurality of representative values calculated from the first conversion image and the plurality of representative values calculated from the second conversion image. Alternatively, from one of the images, a single representative value may be calculated. A plurality of calculation areas are set, thereby searching for the positions in which signal data is discretized and which cannot be specified from the images. If, however, the influence of a change in the density value due to a shift in the position of discretization is small, the positions of discretization may not be searched for. For example, if the pixel size of one of the images is large, and the influence of a change in the density value is small, the positions of discretization may not be searched for, and the smallest difference value may be calculated from difference values between a single representative value on the image and a plurality of representative values on the other image. Consequently, it is possible to speed up the process of calculating the difference value.

(Step S4080) (Is Position of Interest to Be Changed?)

In step S4080, the position acquisition unit 1050 determines whether the difference values at all the positions on the first conversion image are calculated. If the difference values at all the positions are calculated (No in step S4080), the processing proceeds to step S4090. If, on the other hand, the difference values at all the positions are not acquired (Yes in step S4080), the processing returns to step S4040.

(Step S4090) (Generate Subtraction Image)

In step S4090, the subtraction image generation unit 1080 generates a subtraction image of which the density value is the difference value at each position of interest on the first conversion image. Then, the subtraction image generation unit 1080 saves the obtained subtraction image in the data server 110. Further, the subtraction image generation unit 1080 outputs the obtained subtraction image to the display control unit 1090.

In the present exemplary embodiment, the pixel size of the subtraction image may be the same as that of the first image, or may be the same as that of the second image. Alternatively, the pixel size of the subtraction image may be the same as that of the first or second conversion image.

In the above manner, the processing of the image processing apparatus 100 is performed.

Based on the above, in a case where one of images has a smaller pixel size in one axial direction, and the other image has a smaller pixel size in another axial direction, it is possible to match the sizes of areas where density values are referenced, correct the difference between the density values occurring due to the difference in pixel size, and calculate the difference between the images. Consequently, the user can observe a subtraction image on which an artifact is reduced.

In the first exemplary embodiment, based on the density values directly acquired from the first and second images using the deformation information, the difference value is calculated. An image processing apparatus according to a third exemplary embodiment generates a second deformation image by deforming a second image based on deformation information. Then, based on the density value of the second deformation image, the image processing apparatus calculates a difference value between the density value of the second deformation image and the density value of a first image and generates a subtraction image. Consequently, it is possible to acquire the second deformation image on which the position of the same part on the image approximately matches that on the first image, and the subtraction image. Thus, these images are displayed next to each other, whereby the user can easily confirm the positions on the first image and the second deformation image where the difference value on the subtraction image is calculated from the density values.

Figure 6:
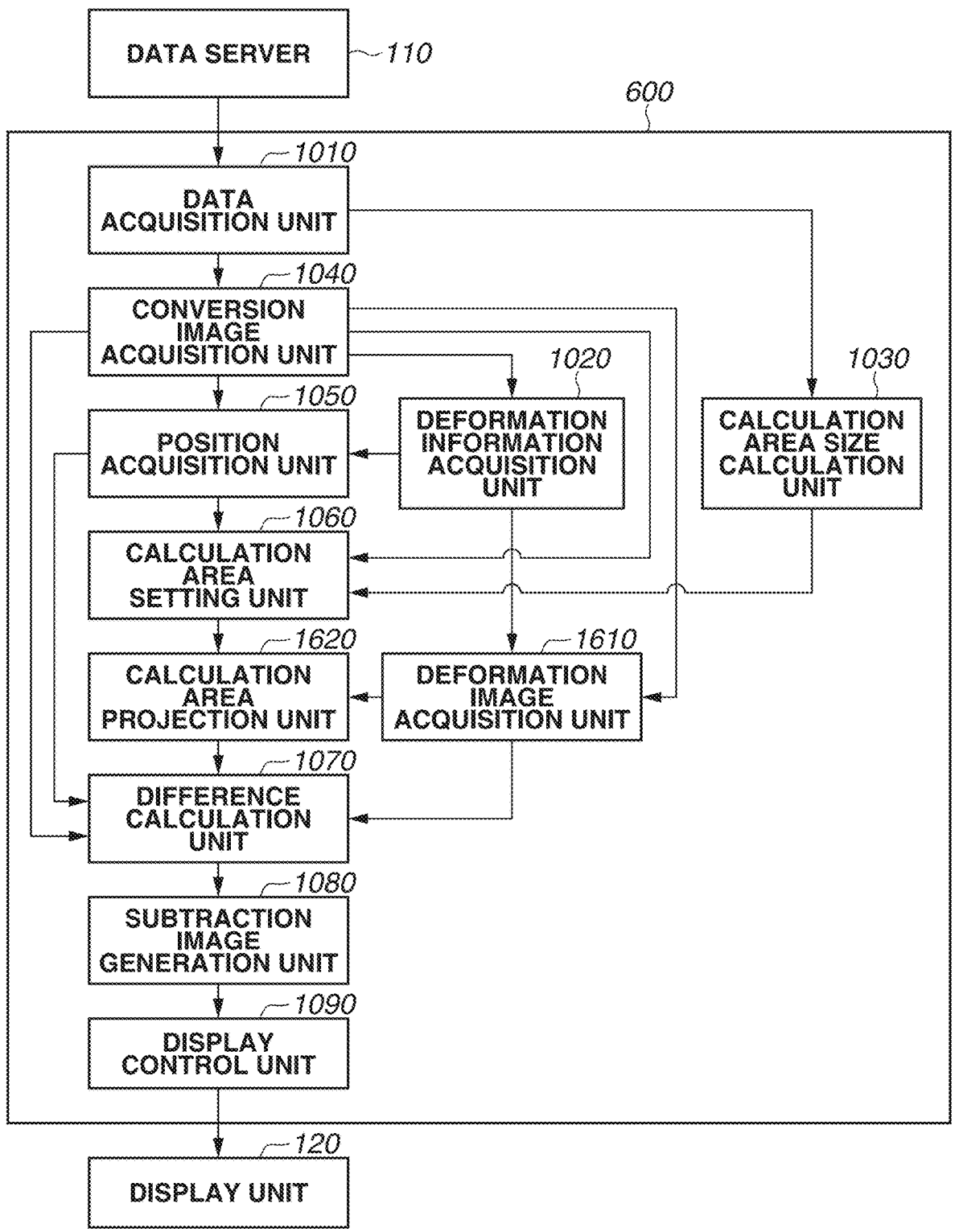
FIG. 6 is a diagram illustrating a device configuration of an image processing apparatus according to a third exemplary embodiment.

FIG. 6 illustrates the configuration of the image processing apparatus according to the third exemplary embodiment. A data server 110 and a display unit 120 are similar to those in the first exemplary embodiment, and therefore are not described here.

An image processing apparatus 600 includes the following components. The functions of a data acquisition unit 1010, a conversion image acquisition unit 1040, a deformation information acquisition unit 1020, a calculation area size calculation unit 1030, a position acquisition unit 1050, a calculation area setting unit 1060, and a subtraction image generation unit 1080 are similar to those in the first exemplary embodiment, and therefore are not described here.

Based on the deformation information, a deformation image acquisition unit 1610 acquires a deformation image obtained by deforming the small pixel image. Based on the deformation information, a calculation area projection unit 1620 projects onto the deformation image the plurality of calculation areas set on the small pixel image and sets a plurality of deformation calculation areas on the deformation image. Based on the density value at the position of interest on the large pixel image and the density values of pixels in the plurality of deformation calculation areas on the deformation image, a difference calculation unit 1070 calculates a difference value at the position of interest. A display control unit 1090 performs control to display the large pixel image, the deformation image, and the subtraction image next to each other on the display unit 120.

Figure 7:
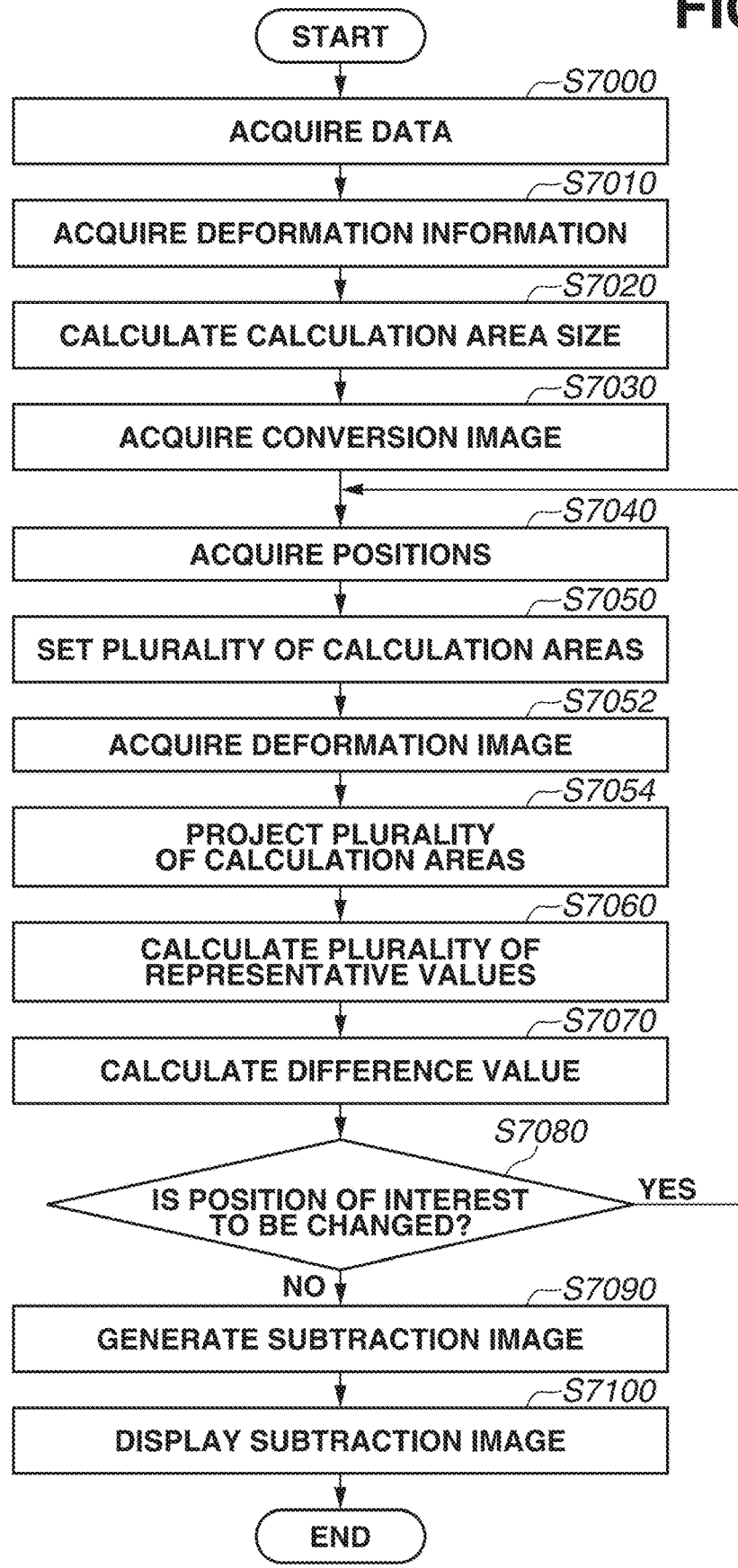
FIG. 7 is a flowchart illustrating an entire processing procedure according to the third exemplary embodiment.

FIG. 7 illustrates a flowchart for an entire processing procedure to be performed by the image processing apparatus 600. The processes of steps S7000 to S7050, S7080, and S7090 are similar to those of steps S2000 to S2050, S2080, and S2090, respectively, in the first exemplary embodiment, and therefore are not described here. Only the differences from the flowchart in FIG. 2 are described below.

(Step S7052) (Acquire Deformation Image)

In step S7052, based on the deformation information, the deformation image acquisition unit 1610 acquires a deformation image obtained by deforming the small pixel image. Then, the deformation image acquisition unit 1610 outputs the acquired deformation image to the calculation area projection unit 1620 and the difference calculation unit 1070. That is, this process corresponds to examples of a deformation information acquisition unit configured to acquire deformation information for performing registration between the first and second images, and a deformation image acquisition unit configured to, based on the acquired deformation information, acquire a deformation image obtained by deforming the second image.

(Step S7054) (Project Calculation Areas)

In step S7054, to acquire, on the deformation image, areas corresponding to the calculation areas on the small pixel image, then based on the deformation information, the calculation area projection unit 1620 projects each of the calculation areas set on the small pixel image as a deformation calculation area onto the deformation image. That is, this process corresponds to an example of a projection unit configured to, based on the deformation information, project onto the acquired deformation image the plurality of calculation areas set on the second image. Then, the calculation area projection unit 1620 outputs the plurality of deformation calculation areas to the difference calculation unit 1070.

At this time, the calculation areas on the small pixel image to be projected may be all the areas in the calculation areas, or may be a plurality of positions sampled in the calculation areas. In a case where all the areas in the calculation areas are to be projected, the entire area within the contour of a deformation area projected onto the deformation image using the deformation information can be set as a deformation calculation area.

(Step S7060) (Calculate Plurality of Representative Values)

In step S7060, by a method similar to that in step S2060 in the first exemplary embodiment, the difference calculation unit 1070 calculates a representative value of the density values of pixels in each of the deformation calculation areas on the deformation image. That is, this process corresponds to an example of the representative value calculation unit configured to calculate the representative value in each of the plurality of calculation areas projected onto the deformation image. Then, the difference calculation unit 1070 outputs the calculated representative value to the subtraction image generation unit 1080.

(Step S7070) (Calculate Difference Value)

In step S7070, by a method similar to that in step S2070 in the first exemplary embodiment, then based on the density value at the position of interest on the large pixel image and the representative value of the density values of the pixels in each of the deformation calculation areas on the deformation image, the difference calculation unit 1070 calculates a difference value at the position of interest. Then, the difference calculation unit 1070 outputs the calculated difference value to the subtraction image generation unit 1080.

(Step S7100) (Display Subtraction Image)

In step S7100, the display control unit 1090 performs control to display the subtraction image generated in step S7090 on the display unit 120.

As an example of the display, for example, the large pixel image, the deformation image, and the subtraction image may be displayed next to each other by dividing a single screen vertically or horizontally. Alternatively, the small pixel image and the deformation image may be able to be displayed by switching the small pixel image and the deformation image.

In the above manner, the processing of the image processing apparatus 600 is performed.

Based on the above, it is possible to observe the same part between a deformation image which is obtained by deforming a small pixel image and on which the same part on the image approximately matches that on a large pixel image, and a subtraction image on which an artifact is reduced, while easily comparing the deformation image and the subtraction image. This has the effect that the user can more easily determine whether a difference value on a subtraction image is a difference due to lesion than in the first exemplary embodiment.

To deform the large pixel image, it is not necessary to project the calculation areas. Thus, the large pixel image in the first exemplary embodiment is replaced with an image obtained by deforming the large pixel image, whereby it is possible to obtain an artifact reduction effect similar to that in the present exemplary embodiment. At this time, registration is performed between the image obtained by deforming the large pixel image and the small pixel image, and these images are represented in the same coordinate system. Thus, a position of interest and a corresponding position can be set as the same position (a third position) on the images. Thus, it is possible to skip the process of acquiring deformation information. That is, a representative value in a plurality of calculation areas set by including the third position on the small pixel image may be acquired, and the difference between the density value at the third position on the image obtained by deforming the large pixel image and the representative value may be calculated.

Other Embodiments

Some embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described some exemplary embodiments, it is to be understood that the claims are not limited to the disclosed exemplary embodiments. The scope of the following claims is to be accorded the broadest interpretation so as to encompass all such modifications and equivalent structures and functions.

This application claims the benefit of Japanese Patent Application No. 2017-167253, filed Aug. 31, 2017, which is hereby incorporated by reference herein in its entirety.

What is claimed is:

1. An image processing apparatus comprising:
an image acquisition unit configured to acquire a first image and a second image;
an area size calculation unit configured to, based on a pixel size of the first image or a pixel size of the second image, whichever is larger, calculate a size of a calculation area;
a calculation area setting unit configured to set on the second image a plurality of calculation areas including a corresponding position on the second image corresponding to a position of interest on the first image in a case where the pixel size of the first image is larger than the pixel size of the second image, the plurality of calculation areas having the calculated area size;
a representative value calculation unit configured to, in each of the plurality of set calculation areas, calculate a representative value based on density values of pixels included in the calculation area; and
a difference unit configured to, based on a density value of a pixel at the position of interest and a plurality of calculated representative values, determine a difference value between the first and second images at the position of interest.

2. The image processing apparatus according to claim 1, wherein based on a difference between the density value of the pixel at the position of interest and each of the plurality of representative values, the difference unit determines the difference value.

3. The image processing apparatus according to claim 2, wherein the difference unit determines, as the difference value between the first and second images at the position of interest, a difference value between a representative value having a small difference from the density value of the pixel at the position of interest among the plurality of representative values and the density value of the pixel at the position of interest.

4. The image processing apparatus according to claim 1, further comprising a pixel size conversion unit configured to convert the pixel size of the second image such that the pixel size of the first image is an odd multiple of the pixel size of the second image.

5. The image processing apparatus according to claim 1, further comprising:
a deformation information acquisition unit configured to acquire deformation information for performing registration between the first and second images;
a deformation image acquisition unit configured to, based on the acquired deformation information, acquire a deformation image obtained by deforming the second image; and
a projection unit configured to, based on the deformation information, project onto the acquired deformation image the plurality of calculation areas set on the second image,
wherein the representative value calculation unit calculates the representative value in each of the plurality of calculation areas projected onto the deformation image.

6. An image processing apparatus comprising:
an image acquisition unit configured to acquire a first image and a second image;
an area size calculation unit configured to, based on a pixel size of the first image or a pixel size of the second image, whichever is larger, calculate a size of a calculation area;
a calculation area setting unit configured to set on the first image a plurality of calculation areas including a position of interest on the first image in a case where the pixel size of the second image is larger than the pixel size of the first image, the plurality of calculation areas having the calculated area size;
a representative value calculation unit configured to, in each of the plurality of set calculation areas, calculate a representative value based on density values of pixels included in the calculation area; and
a difference unit configured to, based on a density value of a pixel at a corresponding position on the second image corresponding to the position of interest and a plurality of calculated representative values, determine a difference value between the first and second images at the position of interest.

7. The image processing apparatus according to claim 6, wherein based on a difference between the density value of the pixel at the corresponding position and each of the plurality of representative values, the difference unit determines the difference value.

8. The image processing apparatus according to claim 7, wherein the difference unit determines, as the difference value between the first and second images at the position of interest, a difference value between a representative value having a small difference from the density value of the pixel at the corresponding position among the plurality of representative values and the density value of the pixel at the corresponding position.

9. The image processing apparatus according to claim 6, further comprising a pixel size conversion unit configured to convert the pixel size of the first image such that the pixel size of the second image is an odd multiple of the pixel size of the first image.

10. The image processing apparatus according to claim 1, wherein based on a difference or a ratio between the pixel size of the first image and the pixel size of the second image, the calculation area setting unit determines whether to set the calculation areas.

11. The image processing apparatus according to claim 1, wherein the first and second images are three-dimensional medical images.

12. An image processing method comprising:
acquiring a first image and a second image;
based on a pixel size of the first image or a pixel size of the second image, whichever is larger, calculating a size of a calculation area;
setting on the second image a plurality of calculation areas including a corresponding position on the second image corresponding to a position of interest on the first image in a case where the pixel size of the first image is larger than the pixel size of the second image, the plurality of calculation areas having the calculated area size;

in each of the plurality of set calculation areas, calculating a representative value based on density values of pixels included in the calculation area; and based on a density value of a pixel at the position of interest and a plurality of calculated representative values, determining a difference value between the first and second images at the position of interest.

13. An image processing system comprising:

an image acquisition unit configured to acquire a first image and a second image;

an area size calculation unit configured to, based on a pixel size of the first image or a pixel size of the second image, whichever is larger, calculate a size of a calculation area;

a calculation area setting unit configured to set on the second image a plurality of calculation areas including a corresponding position on the second image corresponding to a position of interest on the first image in a case where the pixel size of the first image is larger than the pixel size of the second image, the plurality of calculation areas having the calculated area size;

a representative value calculation unit configured to, in each of the plurality of set calculation areas, calculate a representative value based on density values of pixels included in the calculation area; and a difference unit configured to, based on a density value of a pixel at the position of interest and a plurality of calculated representative values, determine a difference value between the first and second images at the position of interest.

14. An image processing method comprising:

acquiring a first image and a second image;

based on a pixel size of the first image or a pixel size of the second image, whichever is larger, calculating a size of a calculation area;

setting on the first image a plurality of calculation areas including a position of interest on the first image in a case where the pixel size of the second image is larger than the pixel size of the first image, the plurality of calculation areas having the calculated area size;

in each of the plurality of set calculation areas, calculating a representative value based on density values of pixels included in the calculation area; and based on a density value of a pixel at a corresponding position on the second image corresponding to the position of interest and a plurality of calculated representative values, determining a difference value between the first and second images at the position of interest.

15. An image processing system comprising:

an image acquisition unit configured to acquire a first image and a second image;

an area size calculation unit configured to, based on a pixel size of the first image or a pixel size of the second image, whichever is larger, calculate a size of a calculation area;

a calculation area setting unit configured to set on the first image a plurality of calculation areas including a position of interest on the first image in a case where the pixel size of the second image is larger than the pixel size of the first image, the plurality of calculation areas having the calculated area size;

a representative value calculation unit configured to, in each of the plurality of set calculation areas, calculate a representative value based on density values of pixels included in the calculation area; and a difference unit configured to, based on a density value of a pixel at a corresponding position on the second image corresponding to the position of interest and a plurality of calculated representative values, determine a difference value between the first and second images at the position of interest.

16. An image processing apparatus comprising:

an image acquisition unit configured to acquire first and second images;

an area size calculation unit configured to, at least in a case where a pixel size of the first image is larger than a pixel size of the second image in a first axis based on which an image is obtained, and the pixel size of the second image is larger than the pixel size of the first image in a second axis, then based on the pixel size of the image having the larger pixel size than the other image in each of the axes, calculate an area size of a calculation area;

a calculation area setting unit configured to set on the first image a plurality of calculation areas including a position of interest on the first image and having the calculated area size, and also set on the second image the plurality of calculation areas including a corresponding position on the second image corresponding to the position of interest, the plurality of calculation areas having the calculated area size;

a representative value calculation unit configured to, in each of the plurality of calculation areas set on the first image, calculate a first representative value based on density values of pixels included in the calculation area, and in each of the plurality of calculation areas set on the second image, calculate a second representative value based on density values of pixels included in the calculation area; and a difference unit configured to, based on a difference between each of a plurality of first representative values and each of a plurality of second representative values, determine a difference value between the first and second images at the position of interest.

17. An image processing method comprising:

acquiring first and second images;

at least in a case where a pixel size of the first image is larger than a pixel size of the second image in a first axis based on which an image is obtained, and the pixel size of the second image is larger than the pixel size of the first image in a second axis, then based on the pixel size of the image having the larger pixel size than the other image in each of the axes, calculating an area size of a calculation area;

setting on the first image a plurality of calculation areas including a position of interest on the first image and having the calculated area size, and also setting on the second image the plurality of calculation areas including a corresponding position on the second image corresponding to the position of interest, the plurality of calculation areas having the calculated area size;

in each of the plurality of calculation areas set on the first image, calculating a first representative value based on density values of pixels included in the calculation area, and in each of the plurality of calculation areas set on the second image, calculating a second representative value based on density values of pixels included in the calculation area; and based on a difference between each of a plurality of first representative values and each of a plurality of second representative values, determining a difference value between the first and second images at the position of interest.

18. An image processing system comprising:

an image acquisition unit configured to acquire first and second images;

an area size calculation unit configured to, at least in a case where a pixel size of the first image is larger than a pixel size of the second image in a first axis based on which an image is obtained, and the pixel size of the second image is larger than the pixel size of the first image in a second axis, then based on the pixel size of the image having the larger pixel size than the other image in each of the axes, calculate an area size of a calculation area;

a calculation area setting unit configured to set on the first image a plurality of calculation areas including a position of interest on the first image and having the calculated area size, and also set on the second image the plurality of calculation areas including a corresponding position on the second image corresponding to the position of interest, the plurality of calculation areas having the calculated area size;

a representative value calculation unit configured to, in each of the plurality of calculation areas set on the first image, calculate a first representative value based on density values of pixels included in the calculation area, and in each of the plurality of calculation areas set on the second image, calculate a second representative value based on density values of pixels included in the calculation area; and a difference unit configured to, based on a difference between each of a plurality of first representative values and each of a plurality of second representative values, determine a difference value between the first and second images at the position of interest.

19. The image processing apparatus according to claim 1, wherein the representative value is a value calculated by a smoothing process.

20. The image processing apparatus according to claim 6, wherein the representative value is a value calculated by a smoothing process.

21. The image processing system according to claim 13, wherein the representative value is a value calculated by a smoothing process.

22. The image processing system according to claim 15, wherein the representative value is a value calculated by a smoothing process.

23. The image processing apparatus according to claim 16, wherein the representative value is a value calculated by a smoothing process.

24. The image processing system according to claim 18, wherein the representative value is a value calculated by a smoothing process.

25. An image processing apparatus comprising:

an image acquisition unit configured to acquire a first image and a second image;

an area size calculation unit configured to, based on a pixel size of the first image or a pixel size of the second image, whichever is larger, calculate a size of a calculation area;

a calculation area setting unit configured to set a plurality of calculation areas in the first image or the second image, whichever is smaller in terms of the pixel size, wherein the plurality of calculation areas is set in such a way as to include a position of interest on the first image or a corresponding position on the second image corresponding to the position of interest, and wherein the plurality of calculation areas has the calculated area size;

a representative value calculation unit configured to, in each of the plurality of set calculation areas, calculate a representative value based on density values of pixels included in the calculation area; and a difference unit configured to, based on a density value of a pixel at the position of interest or at the corresponding position and a plurality of calculated representative values, determine a difference value between the first and second images at the position of interest.

26. The image processing apparatus according to claim 25, wherein the representative value is a value calculated by a smoothing process.

* * * * *